United States Patent Office 3,759,874
Patented Sept. 18, 1973

3,759,874
FLUORINATED POLYURETHANES AS SOIL RELEASE AGENTS
John T. Gresham, Skillman, N.J., assignor to FMC Corporation, New York, N.Y.
No Drawing. Filed Aug. 30, 1971, Ser. No. 176,325
Int. Cl. C08g 22/16
U.S. Cl. 260—77.5 AP    6 Claims

ABSTRACT OF THE DISCLOSURE

Fluorinated polyurethanes are described having a chemical structure made up of the units

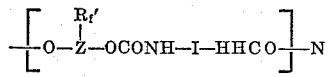

and

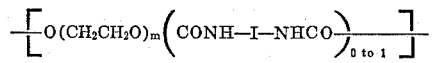

in the ratio of from at least 2 to about 24 fluorinated units to one nonfluorinated unit containing repeating oxyethylene groups, where

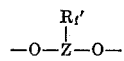

is a residue of a fluorinated diol of the formula

in which $R_f$ is a perfluoroalkyl group of 4–16 carbon atoms, X=O or S, R' is an organic radical of 2–15 carbon atoms which may contain one or more ether linkages and $n=1-11$, $a=1$ or 0, $b=1$ or 2, $a+b=2$, and I is a divalent organic group from a diisocyanate,

$m$ is an integer from about 8 to over 100. The polyurethanes are effective soil release agents for durable press fabrics.

BACKGROUND OF THE INVENTION

(A) Field of the invention

This invention relates to fluorinated polyurethanes as soil release agents for textiles and other porous materials.

(B) Description of the prior art

The treatment or modification of fabrics to improve their properties is routine practice in the textile industry. For instance, thermosetting organic resins are often used to impart "wash and wear" or "permanent press" characteristics to such fabrics as cotton, cotton/polyester blends and other cellulosic blends which naturally wringle badly when cleaned or laundered. Various modifying additives or finishing agents such as softeners, stiffeners, oil and water repellents, etc. are also commonly employed with the resin to provide a suitable commercial fabric.

Despite obvious advantages, durable press garments are difficult to clean due to their proness to soil retention. Investigation of this phenomenon showed that resin treated cotton as well as the synthetic fibers are oleophilic and accordingly dirt, particularly oily stains, cling tenaciously to the fabric substrate and are extremely difficult to remove under normal home washing conditions.

In an effort to overcome the soil removal resistance of treated fabrics, they are commonly treated with a hydrophilic colloid such as carboxymethylcellulose and synthetic polymers such as polyacrylic acid and lower alkyl esters thereof. These materials, which are referred to as soil release agents, apparently coat the textile fibers with a hydrophilic film which allows the fibers to be wet effectively by detergent solutions so that the soils are readily removed by laundering.

More recently, it has been reported that certain fluorinated polyurethanes, with which the present invention is concerned, are useful soil release agents. Thus, French Pat. 1,546,627, dated Oct. 14, 1968 describes a soil release stain repellent composition based on a mixture of a fluorinated polymer, prepared from perfluoroalkylsulamide- or carbamido-alkanols with aromatic diisocyanates, and a hydrophilic, fluorine-free polymer. A later French patent, 1,562,070 of Feb. 24, 1969, is concerned with fluorinated soil-release agents which contain both the fluorinated and hydrophilic portion in the same polymer. The polymers are comprised of "one or more segments containing an average of two or more pendent groups terminating in highly fluorinated aliphatic groups, and one or more segments of different kind each containing an average of more than two polar, i.e. hydrophilic, groups and sufficient organic structure to connect the segments. Individual segments may contain only one of either type group which are usually compensated for in the average by other segments possesing three or more such groups." The polymers are block or graft polymers as well as both.

The fluorinated aliphatic groups are held together in segments directly or through linkages made up of various combinations of functional groups and/or hydrocarbon chains. The fluorinated segment may be represented by

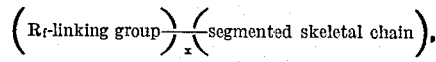

$x$ is an average of at least two.

The preferred composition of the hydrophilic segment is that based on polyoxyalkylene glycols. The molecular weight of the glycols may range from about 150 to 10,000 or more and may be repeated from 1 to 500 or more times.

Other references pertaining to fluorinated polyurethanes are U.S. Pats. 3,217,035 to Lazerte et al. and 3,547,894 to Smeltz et al. The former discloses polyurethanes prepared from a polyfluorosulfonamido polyols while the latter prepares polyurethanes from fluorinated aliphatic diols. The aforesaid references do not mention soil release applications.

SUMMARY OF THE INVENTION

It has now been discovered that excellent soil-release properties are imparted to textiles and similar porous materials by treating them with any of a novel class of fluorinaed polyurethanes having the units

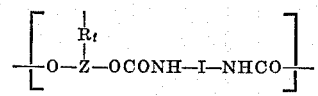

and

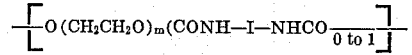

in the ratio of from at least 2 to about 24 fluorinated units to one nonfluorinated unit containing repeating oxyethylene groups, where

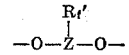

is a residue of a fluorinated diol of the formula

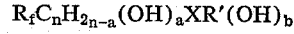

in which $R_f$ is a perfluoroalkyl group of 4–16 carbon atoms, X=O or S, R' is an organic radical of 2–15 carbon atoms which may contain one or more ether linkages and $n=1-11$, $a=1$ or 0, $b=1$ or 2, $a+b=2$, and I is a divalent organic group from a diisocyanate, $I(NCO)_2$, $m$ is an integer from about 8 to over 100. The provision of these novel fluorinated polyurethanes, their preparation and their use as soil-release agents in textiles constitutes the principal object and purpose of the invention.

DETAILED DESCRIPTION AND PREFERRED EMBODIMENT(S)

The fluorinated polyurethanes of the invention are obtained in the known manner of preparing polyurethanes. In these preparations, a polyhydroxyl component is condensed with a diisocyanate to form a urethane adduct which, depending on the ratio of reactants, contains terminal hydroxyl or isocyanate groups. Such adducts can be reacted further in the known manner through such groups to build-up the polyurethane to the desired structure and molecular weight.

In producing the fluorinated compounds of the invention, the source of the fluorinated segment is a fluorinated diol of the formula

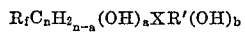

$$R_f C_n H_{2_{n-a}}(OH)_a X R'(OH)_b$$

while the nonfluorinated segment is derived from an organic polyol which contains repeating oxyethylene groups $-O(CH_2CH_2)_m-$ or

$$-O(CH_2CH_2O)_m CONH-I-NHCO-$$

where $m$ is from about 8 to over 100 and $I$ is a divalent organic group from the diisocyanate, $I(NCO)_2$. The units arise from polyethylene glycols of molecular weight from about 350 to 4500. Preferably, the molecular weight range is from 1000 to over 4500. Such polyethylene glycols are known chemical entities many of which are available commercially.

The fluorinated diols, of the type used in practicing the invention are named in U.S. Pat. 3,510,455. They can be prepared by known reactions and syntheses.

Example of suitable fluorinated diols are:

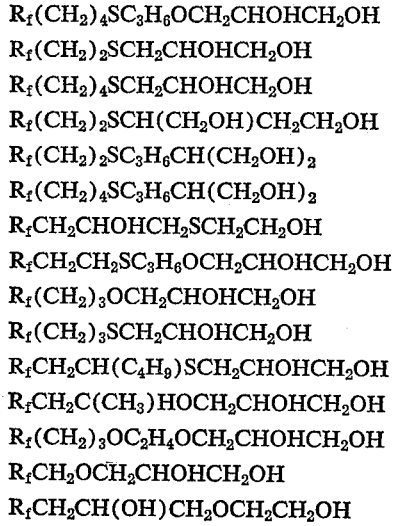

$R_f(CH_2)_4SC_3H_6OCH_2CHOHCH_2OH$ $R_f(CH_2)_2SCH_2CHOHCH_2OH$ $R_f(CH_2)_4SCH_2CHOHCH_2OH$ $R_f(CH_2)_2SCH(CH_2OH)CH_2CH_2OH$ $R_f(CH_2)_2SC_3H_6CH(CH_2OH)_2$ $R_f(CH_2)_4SC_3H_6CH(CH_2OH)_2$ $R_fCH_2CHOHCH_2SCH_2CH_2OH$ $R_fCH_2CH_2SC_3H_6OCH_2CHOHCH_2OH$ $R_f(CH_2)_3OCH_2CHOHCH_2OH$ $R_f(CH_2)_3SCH_2CHOHCH_2OH$ $R_fCH_2CH(C_4H_9)SCH_2CHOHCH_2OH$ $R_fCH_2C(CH_3)HOCH_2CHOHCH_2OH$ $R_f(CH_2)_3OC_2H_4OCH_2CHOHCH_2OH$ $R_fCH_2OCH_2CHOHCH_2OH$ $R_fCH_2CH(OH)CH_2OCH_2CH_2OH$

A wide variety of aliphatic and aromatic diisocyanates may be used. Desirably, they are chosen so that the two isocyanate groups differ in reactivity. Preferred diisocyanates are isophorone diisocyanate and 2,4-tolylene diisocyanate. Typical useful isocyanates include 1,2-ethylene diisocyanate;
1,6-hexylene diisocyanate;
lysine diisocyanate;
bis(2-isocyanatoethyl) fumarate;
1,4-cyclohexylene diisocyanate;
methylcyclohexylene diisocyanate;
2,2,4-trimethyl-1,6-hexylene diisocyanate;
2,6-tolylene diisocyanate;
4,4'-diisocyanatodiphenyl ether;
4,4'-diisocyanatodiphenylmethane;
3,3'-dichloro-4,4'-diisocyanatodiphenylmethane;
4,4'-diphenyl diisocyanate;
4,4'-diisocyanatodibenzyl;
3,3'-dimethyl-4,4'-diisocyanatodiphenyl;
2,2'-dimehtyl-4,4'-diisocyanatodiphenyl;
3,3'-dimethoxy-4,4'-diisocyanatodiphenyl;
2,2'-dichloro-5,5'-dimethoxy-4,4'-diisocyanatodiphenyl;
3,3'-dichloro-4,4'-diisocyanatodiphenyl;
1,3-diisocyanatobenzene;
1,4-diisocyanatobenzene;
1,2-naphthylene diisocyanate;
4-chloro-1,2-naphthylene diisocyanate;
4-methyl-1,2-naphthylene diisocyanate;
1,3-naphthylene diisocyanate;
1,4-naphthylene diisocyanate;
1,5-naphthylene diisocyanate;
1,6-naphthylene diisocyanate;
1,7-naphthylene diisocyanate;
1,8-naphthylene diisocyanate;
4-chloro-1,8-naphthylene diisocyanate;
2,3-naphthylene diisocyanate;
2,7-naphthylene diisocyanate;
1,8-dinitro-2,7-naphthylene diisocyanate;
1-methyl-2,4-naphthylene diisocyanate;
1-methyl-5,7-naphthylene diisocyanate;
6-methyl-1,3-naphthylene diisocyanate and
7-methyl-1,3-naphthylene diisocyanate.

The nonfluorinated unit which contains repeating oxyethylene groups is either $-O(CH_2CH_2O)_m-$ or

$$-O(CH_2CH_2O)_m CONH-I-NHCO-$$

where $m$ is from about 8 to over 100 and $I$ is a divalent organic group from the diisocyanate, $I(NCO)_2$. The unit arises from polyethylene glycols of molecular weight from about 350 to 4500. Preferably, the molecular weight range is from 1000 to over 4500.

The polyurethanes are prepared such that there is a preponderance of fluorinated units relative to the non-fluorinated unit. The ratio ranges from at least 2/1 to 24/1. When the polyethylene glycol is of molecular weight 1000 to over 4500 the ratio is preferably 6–24 to 1.

The polyurethanes are comprised almost entirely of these units preferably in an ordered fashion as in a block polymer. The structure of the polyurethanes can be represented, but not limited thereto, by the formulae below

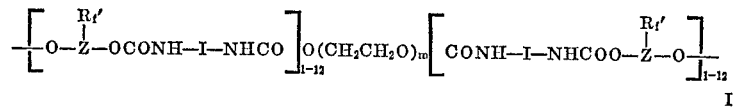

$$\left[ O-\underset{\underset{R_f'}{|}}{Z}-OCONH-I-NHCO \right]_{1-12} O(CH_2CH_2O)_m \left[ CONH-I-NHCOO-\underset{\underset{R_f'}{|}}{Z}-O \right]_{1-12}$$

I

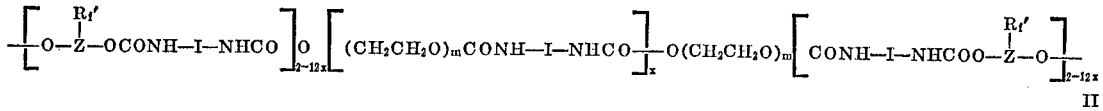

$$\left[ O-\underset{\underset{R_f'}{|}}{Z}-OCONH-I-NHCO \right]_{2-12x} O \left[ (CH_2CH_2O)_m CONH-I-NHCO \right]_x O(CH_2CH_2O)_m \left[ CONH-I-NHCOO-\underset{\underset{R_f'}{|}}{Z}-O \right]_{2-12x}$$

II where $x$ is an integer.

The fluorinated polyurethanes may be terminated in a number of ways. When at least one mole of diisocyanate is used in addition to that equivalent to the sum of the number of moles of fluorinated diol and polyethylene glycol used, the polyurethane is terminated for the most part with isocyanate groups. These may be left unreacted or may be partially or completely reacted with one or more of the following: an isocyanate blocking agent, a chain extender and a cross-linking agent. The unreacted isocyanate groups are potential cross-linking groups or reactive groups with the substrate to which they become applied.

Isocyanate blocking agents protect NCO groups until they are needed. Under curing conditions the blocked isocyanate groups revert to isocyanate groups for cross-linking or substrate reaction to increase durability.

The isocyanate blocking agent may be any one of those normally used to block isocyanates in urethane technology, for example: aryl alcohols, such as phenol, cresol, o- and p-nitrophenol, o- and p-chlorophenol, naphthol, 4-hydroxybiphenyl; oximes such as acetone oxime, butanone oxime; aryl mercaptans such as thiophenol; other organic active hydrogen compounds such as diethyl malonate, acetylacetone, ethyl acetoacetate, ethyl cyanoacetate, and eta-caprolactam; and inorganic compounds such as sodium bisulfite and hydroxylamine.

Chain extending agents are compounds with about two to four active hydrogens. No more than two active hydrogens may be attached to a single atom. Groups that contain active hydrogens in clude OH, NH, $NH_2$, $CO_2H$, $CO_2NH_2$, $SO_2NH_2$ and SH. Typical chain extending agents are water, hydrogen sulfide, ethylene glycol, ethylene-contains black isocyanate groups as well as free isocyanate groups. After reaction no unreacted isocyanate group is left.

Alternatively, the polyurethane may contain terminal hydroxyl groups when the number of moles of diisocyanate used is one less than the sum of the moles of the fluorinated diol and polyethylene glycol used. This polyurethane may be converted to a product similar to that above, terminated with isocyanate groups, by reacting it with two moles of a diisocyanate. The resulting polyurethane may then be converted to the final product as already described.

The hydroxyl terminated polyurethane may also be reacted with ont to two moles of a partially blocked di- or polyisocyanate. A diisocyanate is preferred. Such a blocked isocyanate contains on average only one unreacted isocyanate group per molecule and reacts with a hydroxyl group of the polyurethane to form a urethane linkage. The resulting polyurethane contains 0–1 hydroxyl group and on average at least one blocked isocyanate group. On curing a high molecular weight polyurethane can be formed.

The hydroxyl terminated polyurethane may also be mixed with a completely blocked di- or polyisocyanate to achieve cross-linking on curing.

There are several methods for preparing the polyurethanes. In the preferred method the polyurethane formed is composed of one or more blocks of fluorinated units and a block of one or more nonfluorinated units containing repeating oxyethylene groups. For the most part the latter unit is attached at each end in the polyurethane to a fluorinated block. For example,

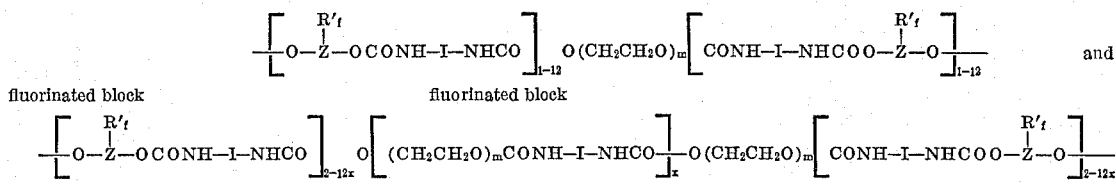

diamine, 1,2-ethanedithiol, triethanolamine, 2,4-tolylenediamine, and adipic acid. Diamines are preferred. The chain extending agents are used to increase the molecular weight of an isocyanate-containing polyurethane by coupling it with at least one other polyurethane. Usually at least 0.5 mole is used per mole of the isocyanate-containing polyurethane. The resulting higher molecular weight polyurethane still contains unreacted isocyanate groups which may be reacted with isocyanate blocking agents or a cross-linking agent.

Cross-linking agents are active hydrogen compounds consisting of diols, triols and aminoalcohols with only one nitrogen atom. Preferred cross-linking agents are ethanolamine, N-methylethanolamine, triethanolamine, trimethylolpropane, etc. These provide additional active hydrogens for reaction with blocked isocyanates during curing. They are added last in the synthesis to a polyurethane which The preparation is carried out by reacting one mole of a fluorinated diol with one mole of a diisocyanate, preferably with one in which the two isocyanate groups differ in reactivity, so that the product contains as much 1:1 adduct as possible. This can be enhanced if one of the hydroxy groups of the diol is secondary and the other primary. The reaction can be illustrated by

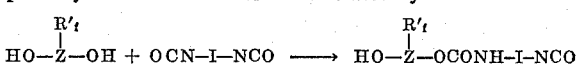

The fluorinated adduct is reacted with a reaction product of between 1–2 (preferably 2) moles of diisocyanate and one mole of a polyethylene glycol. The amount of fluorinated adduct is chosen such that the resulting polyurethane is comprised of fluorinated diol units in the ratio of from 2–24 per polyethylene glycol unit. The reaction can be illustrated by the equation.

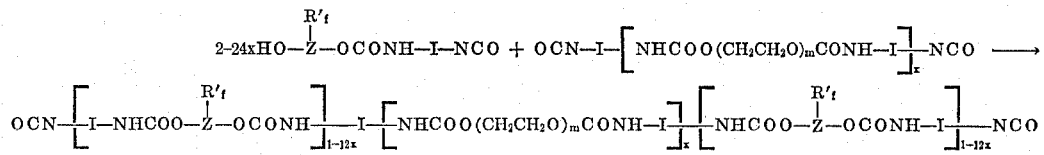

when 2 moles of diisocyanate are used to react with 1 mole of polyethylene glycol, x=1.

Alternately, the fluorinated adduct may be reacted directly with the polyethylene glycol. The ratio remains the same. The product may be represented by the structure

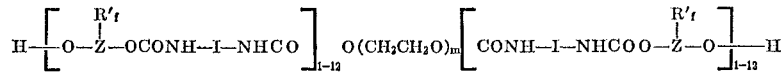

These products may be converted to final products as described above by reaction with isocyanate blocking agents, chain extenders, cross-linking agents and diisocyanates.

The preceding methods of preparation result in polyurethanes with blocks of fluorinated units and nonfluorinated units. Polyurethanes may also be prepared in which the fluorinated units and nonfluorinated units occur randomly in the polyurethane. In some instances polyurethanes so prepared do not perform as well. Such as polyurethane can be prepared by reacting a mixture of the fluorinated diol and polyethylene glycol with the appropriate amount of diisocyanate to give a polyurethane terminating in predominantly isocyanate groups or hydroxyl groups.

The reactions are carried out preferably, but not necessarily, in the presence of an organic solvent and at temperatures of from about room temperature to about 130° C., preferably 45–100° C. The solvents employed must not contain hydrogens reactive with isocyanate groups. The solvents must be capable of dissolving the fluorinated diols, polyethylene glycol, and the diisocyanates. Suitable solvents include ketones, such as acetone, methyl ethyl ketone, methyl isobutyl ketone, ethers, such as dioxane, tetrahydrofuran, diethylene glycol dimethyl ether, chlorinated solvents such as methylchloroform, trichloroethylene, and some aromatic compounds such as methylchloroform, trichloroethylene, and some aromatic compounds such as toluene and xylene. Mixtures of two or more solvents may be desirable.

The reaction may be accelerated by the use of various catalysts such as tertiary amines (pyridine, triethylenediamine and triethylamine) and organometallic compounds (stannous octoate, lead octoate, and dibutyltindilaurate). These catalysts are particularly helpful at the later stages of synthesis, particularly in the reaction with a blocking agent, a chain extender and a cross-linking agent.

Reference is made to the following non-limiting examples.

PREPARATION OF FLUORINATED DIOLS

EXAMPLE 1

$C_8F_{17}CH_2CH_2CH_2OCH_2CHOHCH_2OH$ $C_8F_{17}CH_2CHICH_2OCH_2CHOHCH_2OH$.—A mixture of 109.2 g. (0.2 mole) of 1-iodoperfluorooctane, 26.4 g. (0.2 moles) of 3-allyloxypropanediol, and 0.3 g. of azobis(isobutyronitrile) was heated to 70° for 22 hours. Two additional 0.15 g. portions of catalyst were added during the reaction. The unreacted starting materials were distilled off by heating to 120° (0.05 mm.). The crude yield was 115 g. (85%).

Analysis.—Calcd. for $C_{14}F_{17}H_{12}IO_3$ (percent): I, 18.71. Found (percent): 18.78.

$C_8F_{17}CH_2CH_2CH_2OCH_2CHOHCH_2OH$.—A mixture of 51 g. (0.075 mole) of $C_8F_{17}CH_2CHICH_2OCH_2CHOHCH_2OH$ 12.5 g. of powdered anhydrous potassium carbonate, 5 g. of 5% palladium on charcoal, and 200 ml. of absolute ethanol was hydrogenated in a Parr apparatus at 50 lb./in.². The pressure loss was 8 lb./in.². The catalyst was removed by filtration, the solvent evaporated, and the residue taken up in ethyl acetate. After washing and drying, the ethyl acetate was removed to leave 38 g. (92%) of white solid, M.P. 55°. The iodine analysis gave 0.11% I.

EXAMPLE 2

$C_8F_{17}(CH_2)_2SC_3H_6OCH_2CHOHCH_2OH$

A mixture of 24 g. (0.04 mole) of $C_8F_{17}CH_2CH_2SH$ (prepared from $C_8F_{17}CH_2CH_2I$ and thiourea), and 6.6 g. (0.05 mole) of allyloxypropanediol (not miscible) reacted when heated to 50°, although no catalyst was present. The temperature rose to 67°. As the temperature dropped, the mixture solidified and was rewarmed to 80° to melt it. At the end of the day, 0.09 g. of azobis(isobutyronitrile) was added and the liquid stirred overnight at 90°. In the morning, the mixture had solidified. It was heated to 150° (0.07 mm.) (bath temperature) to remove unreacted substances. The yield of white solid, M.P. 91°, was 28.5 g. (93%).

Analysis.—Calcd. for $C_{16}F_{17}H_{16}O_3S$ (percent): S, 5.23. Found (percent): S, 5.64.

EXAMPLE 3

$C_8F_{17}(CH_2)_2SC_3H_6CH(CH_2OH)_2$ $C_8F_{17}(CH_2)_2SC_3H_6CH(CO_2C_2H_5)_2$.—A mixture of 96 g. (0.2 moles) of $C_8F_{17}CH_2CH_2SH$ (90.1%

$C_8F_{17}CH_2CH_2SH$ 1.4% $C_{10}F_{21}CH_2CH_2SH$, 5.6% $C_8F_{17}(CH_2)_4SH$ and 1.4% $C_{10}F_{21}(CH_2)_4SH$), 40 g. (0.2 mole) of diethyl allylmalonate, and 0.15 g. of azobis(isobutyronitrile) was heated to 65°, at which point an exotherm increased the temperature to 78°. When the temperature had dropped to 65°, another 0.07 g. of catalyst was added, and 5 hours later, another 0.07 g. was added. The mixture was heated overnight at 67°. The mixture was then heated to 160° (0.5 mm.) (bath temperature) to remove nonreactants. The yield of crude product was 122.5 g. (90%).

Analysis.—Calcd. for $C_{20}F_{17}H_{21}O_4S$ (percent): C, 35.30; H, 3.11; S, 4.71. Found (percent): C, 36.09; H, 3.33; S, 5.28.

$C_8F_{17}(CH_2)_2SC_3H_6CH(CH_2OH)_2$.—A solution of 51 g. (0.075 mole) of $C_8F_{17}(CH_2)_2SC_3H_6CH(CO_2C_2H_5)_2$ in 150 ml. of dry ether was added over 0.75 hr. to a solution of 5.7 g. 0.15 mole) of lithium aluminum hydride in 350 ml. of dry ether. After 4 hours stirring at reflux, another gram of hydride was added and the reaction continued overnight. The reaction was continued another 48 hours adding 2 g. more of hydride each morning. Excess hydride was decomposed with ethyl acetate followed by 600 ml. of 10% sulfuric acid. The ether layer was washed, dried and the solvent evaporated. The yield of crude product was 38.6 g. which was recrystallized from benzene to give 16.2 g. (36%) of a white fluffy powder, M.P. 90–91°.

Analysis.—Calcd. for $C_{16}F_{17}H_{17}O_2S$ (percent): C, 32.19; H, 2.88; S, 5.38. Found (percent) C, 32.16; H, 3.37; S, 5.81.

EXAMPLE 4

$C_8F_{17}CH_2CH_2SCH(CH_2OH)CH_2CH_2OH$

A mixture of 12 g. (0.05 mole) of $C_8F_{17}CH_2CH_2SH$, 2.2 g. (0.05 mole) of 2-butene-1,4-diol, 6 ml. of butanone, and 0.06 g. azobis(isobutyronitrile) was heated to 60° for 30 hours. The mixture became miscible after 2 hours. Two additional portions of catalyst were added during the course of the reaction. The mixture was diluted with water and the oil taken up in methylene chloride. The organic layer was washed with 5% sodium carbonate solution and water, then dried over magnesium sulfate, and the solvent evaporated to leave 10.5 g. (74%) of a yellow wax, M.P. 55–58°.

*Analysis.*—Calcd. for $C_{14}F_{17}H_{13}O_2S$ (percent): S, 5.64. Found (percent): 5.87.

EXAMPLE 5

$C_8F_{17}CH_2CH_2SCH_2CHOHCH_2OH$

To a solution of 574 g. (about one mole) of $C_8F_{17}CH_2CH_2I$ (about 2% $C_6F_{13}CH_2CH_2I$, 85% $C_8F_{17}CH_2CH_2I$, 9% $C_{10}F_{21}CH_2CH_2I$ and 4% $C_8F_{17}(CH_2)_4I$) in 600 ml. of ethanol at 53° was added a solution of 68 g. (1.03 mole) of 85% potassium hydroxide and 115 g. (1.06 mole) of 3-mercapto-1,2-propanediol in 350 ml. of ethanol over 0.5 hr. The temperature rose to 68°. The mixture was then stirred at 55° for 4 hours, neutralized with acetic acid, and most of the solvent removed under reduced pressure on the rotary evaporator. The residue was taken up in ethyl acetate and washed with 5% sodium hydroxide solution, 5% sodium bicarbonate solution, and water, then dried over magnesium sulfate. Evaporation of the solvent left 490 g. (89%) of solid product, M.P. 103–106° which contained 0.07% iodine by analysis. A 335 g. sample was distilled collecting 309 g. of a white crystalline solid, M.P. 102–106°.

*Analysis.*—Calcd. for $C_{13}F_{17}H_{11}O_2S$ (percent): C, 28.17; H, 2.00; S, 5.78. Found (percent): C, 27.76; H, 1.89; S, 5.95.

EXAMPLE 6

Mixture of $C_8F_{17}CH_2CH_2SCH_2CHOHCH_2OH$, $C_8F_{17}(CH_2)_4SCH_2CHOHCH_2OH$ and $C_{10}F_{21}CH_2CH_2SCH_2CHOHCH_2OH$ Example 5 was repeated using 63 g. (about 0.1 mole) of a mixture of 13% $C_8F_{17}CH_2CH_2I$, 37%

$C_{10}F_{21}CH_2CH_2I$,

44% $C_8F_{17}CH_2CH_2CH_2CH_2I$, and 1% $C_6F_{13}CH_2CH_2I$. The yield of product, M.P. 122–124°, was 49.6 g. (86%).

EXAMPLE 7

$C_8F_{17}CH_2CHOHCH_2SCH_2CH_2OH$ $C_8F_{17}CH_2CHICH_2OH$.—A mixture of 327.6 g. (0.6 mole) of 1-iodoperfluorooctane, 35.1 g. (0.6 mole) of allyl alcohol, and 1 g. of azobis(isobutyronitrile) was stirred at 75° for 4 hours. No exotherm was noted. Another 0.5 g. of catalyst was added and the reaction continued overnight. The product was then freed of volatiles under reduced pressure. The residues, M.P. 85–88°, weighed 199 g. The distilled liquid (163.3 g.) was treated again with azobis(isobutyronitrile) as above giving an additional 69.3 g. of product. The total yield was 74% plus another 90 g. of distillate which could be recycled. By gas chromatography, the product was 86.9% pure $C_8F_{17}$ homolog with 4.3% $C_6F_{13}$ and 4.8% $C_{10}F_{21}$.

$C_8F_{17}CH_2CHOHCH_2SCH_2CH_2OH$.—To a solution of 16.0 g. (0.205 mole) of mercaptoethanol and 13.6 g. (0.205 mole) of potassium hydroxide in 250 ml. of ethanol was added 120.8 g. (0.2 mole) of $C_8F_{17}CH_2CHICH_2OH$, in 125 ml. of ethanol over 1 hour. After stirring overnight, the mixture was neutralized with acetic acid, the ethanol distilled off, and the residue taken up in ethyl acetate. After washing and drying, the solvent was evaporated to leave 98 g. (88%) of crude product, M.P. 75–80°. The NMR spectrum indicates that the product is largely $C_8F_{17}CH_2CHOHCH_2SCH_2CH_2OH$ formed by addition of mercaptoethanol to an oxirane,

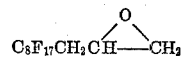

which results from the loss of hydrogen iodide from the starting iodo alcohol.

Preparation of fluorinated polyurethanes

*Isocyanate assay.*—The isocyanates used were analyzed by ASTM procedure D1638–67T. For example, an 80/20 2,4-/2,6-tolylene diisocyanate mixture assayed 99.7%, isophorone diisocyanate assayed 99.0%, polymethylenepolyphenylene isocyanate (PAPI, Upjohn) assayed 97.5%, and phenyl isocyanate assayed 99.3%.

*Hydroxyl equivalent weights of alcohol, diols and triols.*—The hydroxyl equivalent weight of the polyethylene glycols and fluorinated diols were determined by a method based on that of Reed, Critchfield and Elder (Analytical Chem. 35, 571 (1963)) and ASTM procedure D1638–67T. The general procedure is given below.

About 0.012 equivalent of the hydroxyl containing compound was placed in 50 ml. of reagent grade toluene and heated to reflux under nitrogen. About 15 ml. of a distillate was removed to ensure complete removal of water as an azeotrope. The toluene solution was cooled and 20 ml. of 1.51 N phenyl isocyanate in dry toluene was added by pipette. The mixture was heated at 65 or 70°. If reaction was slow, which was usually the case with the diols and triols, one drop of dibutyltindilaurate was added and heating continued for about 3 hours further. After cooling, 2 N dibutylamine in dry toluene (20 ml.) was added by pipette. The mixture was stirred for 20 minutes at room temperature. 2-propanol (80 ml.) and 0.4 ml. bromcresol green indicator solution (see ASTM D1638–67T) were added. Titration was carried out with either 1 N or 0.5 N HCl.

A blank was run similarly using no hydroxyl compound and no phenyl isocyanate. The HCl equivalent, another blank, was determined in which all reagents were present but the hydroxyl compound. This value is the number of mls of HCl required to neutralize excess dibutylamine after reaction with phenyl isocyanate. The equivalent weight was calculated from the formula:

$$\frac{(\text{sample wt.}) \; 1000}{[B-H-S] \; N}$$

where

B = ml. of HCl for blank
S = ml. of HCl for sample
N = normality of HCl
H = HCl equivalene Some of the compounds determined and their equivalent weights are listed below. The equivalent weights were run in duplicate and are reported as an average.

| Sample | Reaction temp. (° C.) | Reaction time (hr.) | Reaction time after addition of catalyst (hr.) | Average equiv. wt. |
|---|---|---|---|---|
| $C_8F_{17}(CH_2)_2SC_2H_5OCH_2CH(OH)CH_2OH$ (Example 2) | 70 | 22 | 4 | 298 |
| $C_8F_{17}(CH_2)_2SCH_2CH(OH)CH_2OH$ (Example 5) | 70 | 27 | 3 | 281 |
| $C_6F_{13}(CH_2)_2SCH_2CH(OH)CH_2OH$ | 65 | 24 | 6 | 227 |
| $R_f(CH_2)_{2,4}SCH_2CH(OH)CH_2OH$ (Example 6) | 65 | 24 | 6 | 296 |
| $C_8F_{17}CH_2CH_2CH_2OCH_2CH(OH)CH_2OH$ (Example 1) | 65 | 23 | 3 | 261 |
| $C_8F_{17}CH_2CHOHCH_2SCH_2CH_2OH$ (Example 7) | 65 | 25 | 3 | 294 |
| Carbowax 1540 a | 65 | 18 | | 813 |
| Carbowax 4000 a | 65 | 18 | | 1,684 | a Union Carbide brand of polyethylene glycol where the number refers to average molecular weight.

Determination of conversion.—During the course of preparing these polyurethanes it was advantageous to measure the degree of reaction to determine its progress and the number of equivalents of isocyanate remaining. The measurement was carried out by a procedure similar to that of the hydroxyl equivalent weight determination as follows.

An accurately weighed sample was removed from the reaction mixture and diluted with 20 ml. of spectro grade acetone, dried over molecular sieves. 2 N dibutylamine (10 ml.) solution was added and the mixture stirred for 20 minutes. Isopropanol (80 ml.) and the same indicator were added and the mixture titrated as above with hydrochloric acid. The conversion was calculated from the formula $$\text{Percent conversion} = \frac{100}{R} - \frac{(B-S) \, NE \, 100}{1000 \, WIR}$$

B, S and N are the same as before. E is the equivalent weight of the diisocyanate used such as IDPI or TDI. W is the weight of sample (based on approximately 0.005 equivalents available NCO). I is the fraction of the initial amount of diisocyanate by weight in the reaction mixture. R is the fraction of all the isocyanate groups expected to have reacted up to this point.

EXAMPLE 8

Preparattion of Carbowax 1540—Isophorone diisocyanate (IPDI) adduct

A mixture of 32.5 g. (0.02 moles based on hydroxyl equivalent weight of 813) of Carbowax 1540 (Union Carbide polyethylene glycol) and 50.0 g. of dry toluene was distilled to remove water present in the Carbowax. A total of 38.8 g. of distillate was collected. Isophorone diisocyanate (9.006 g., 0.04 mole) and 30.3 g. of diglyme (distilled from LiAlH₄ and stored over molecular sieves) were added. The reaction mixture was heated one hour at 65° and overnight at 80°. After approximately 20 hours at 7.974 g. sample was taken and analyzed. The conversion was 40.8%. Heating was continued for 53½ hours, at which point the conversion was 100%.

Preparation of fluorinated polyurethane soil-release agent from Carbowax 1540–IPDI adduct Under a nitrogen atmosphere a mixture of 6.14 g. isophorone diisocyanate (IPDI), 14.64 g. of

$C_8F_{17}(CH_2)_3OCH_2CHOHCH_2OH$ (Example 1) and 40.7 g. of methylchloroform was heated at 65° for 2½ hours. Analysis of a 6.239 g. sample showed the conversion was 102.3% indicating that half of the isocyanate groups added had reacted as desired.

A portion of the above solution (24.41 g.), 5.775 g. of the solution of the Carbowax-IPDI adduct (ratio of fluorinated diol to polyethylene glycol was 12) and 3.5 of diglyme were heated in a nitrogen atmosphere for 64 hours at 75–80°. Infrared analysis indicated disappearance of hydroxy groups. Analysis of a 5.290 g. sample showed the reaction was complete. The remaining isocyanate groups were reacted overnight at 75° with 0.142 g. of p-nitrophenol to block the isocyanates groups. Infrared analysis showed no remaining isocyanate groups. The final product was a hazy solution (25 g. of the polyurethane. Analysis indicated the mixture contained 10.16% F.

EXAMPLE 9

Preparation of Carbowax 4000—Isophorone diisocyanate (IPDI) adduct

A mixture of 67.4 g. Carboxwax 4000 (0.02 moles based on hydroxyl equivalent of 1684) and 60 g. of toluene was distilled to remove water. A total of 32.5 g. of distillate was collected. Isophorone diisocyanate (9.008 g., 0.04 mole), 24.45 g. of spectro grade acetone dried over molecular sieves, and 24.45 g. diglyme (distilled from LiAlH₄ and stored over molecular sieves) were added and the mixture heated to 65° for 1 hour, 32 hours at 80–90°, and 72 hours at 65°. Analysis of a 8.071 g. sample indicated conversion was only 71.6%. One drop of dibutyltin dilaurate was added and heating continued for about 24 hours. The reaction was not complete and another drop of catalyst was added. After heating for 24 hours the conversion was 103%.

Preparation of fluorinated polyurethane soil-release agent from Carbowax 4000–IPDI adduct A mixture of 6.147 g. of isophorone diisocyanate (IPDI), 15.77 g. of

$C_8F_{17}CH_2CHOHCH_2SCH_2CH_2OH$ (Example 7) and 40.7 g. methylchloroform was heated for 31 hours at 65°. Analysis indicated the conversion was 98%.

A portion of the preceding reaction mixture (27.6 g.), 12.20 g. of the above solution of the Carboxwax–IPDI adduct (ratio of fluorinated diol to polyethylene glycol was 10), 5 g. methylchloroform and 3 drops of a 1% solution of dibutin di-2-ethylhexoate as catalyst were heated under nitrogen at 80° for 48 hours. Analysis of a 7.601 g. sample indicated reaction was essentially complete. The isocyanate terminated polyurethane was reacted with 0.638 g. of p-nitrophenol in 10 g. of methyl ethyl ketone at 80° over the weekend. Infrared analysis showed no unreacted isocyanate groups.

EXAMPLES 10–20

A series of fluorinated polyurethane soil-release agents were prepared from $C_8F_{17}(CH_2)_2SCH_2CHOHCH_2$ (Example 5) following the procedures of Examples 8 and 9. See Table I. In these examples the molar ratio of fluorinated diol to polyethylene glycol was 8, 12 and 16 as

TABLE I

[Fluorinated polyurethane soil-release agents prepared from $C_8F_{57}(CH)_2SCH_2CHOHCH_2OH$]

| Example | Carbowax-PD adduct (moles)[a] | Rf diol-IPDI adduct (moles)[b] | Blocking agent (moles) | Chain extenders (moles) | Cross-linking agent (moles) | Percent F of final solution of product |
|---|---|---|---|---|---|---|
| 10 | CW 1540 (1) | 8 | 2-BO[c] (0.80) | | | 10.20 |
| 11 | CW 1540 (1) | 8 | 2-BO (2.00) | | | 7.91 |
| 12 | CW 1540 (1) | 12 | 2-BO (2.00) | | | 7.98 |
| 13 | CW 1540 (1) | 16 | 2-BO (2.00) | | | 8.81 |
| 14 | CW 4000 (1) | 8 | 2-BO [d] | | | 10.93 |
| 15 | CW 4000 (1) | 12 | 2-BO [d] | | | 8.74 |
| 16 | CW 4000 (1) | 16 | 2-BO [d] | | | 7.89 |
| 17 | CW 1540 (1) | 8 | 0 | | | 13.10 |
| 18 | CW 1540 (1) | 8 | | | EA[e] (2.0) | 9.54 |
| 19 | CW 1540 (1) | 8 | | EDA[f] (0.5) | EA[f] (1.0) | 10.19 |
| 20 | CW 1540 (1) | 8 | 2-BO[g] (1.00) | EDA[g] (0.5) | | 10.03 |

[a] Prepared from one mole of Carbowax (CW) and 2 moles of isophorone diisocyanate (IPDI).
[b] Prepared from one mole of Rf diol and 1 mole of isophorone diisocyanate.
[c] 2-BO=2-butanone oxime.
[d] A sufficient amount was added to react with the amount of isocyanate groups present as determined by analysis, amount was less than 2.0 moles (theoretical).
[e] EA=2-ethanolamine. Two equivalents of 2-butanone oxime blocked PAPI were also added.
[f] EDA=ethylenediamine, followed by 1.0 mole 2-ethanolamine (EA). Two equivalents of 2-butanone oxime blocked PAPI were added at end of reaction.
[g] 0.5 mole ethylene diamine followed by 1.0 mole 2-butanone oxime.

indicated. Chain extenders and cross-linking agents were used in three of the examples.

Textile application

The polyurethanes were applied at 0.1 and 0.2% F on weight of the fabric (OWF) to 65/35 Dacron/cotton tan fabric (4 oz./yd.$^2$) treated with a durable-press resin (6% OWF) which had been dried but not cured. After applying the polyurethane by padding the fabric was dried, cured and rated for oil repellency by AATCC Test Method 118-1966 and solid release by a slightly modified AATCC Test Method 130-1969.

Four test stains were used, Wesson oil, Nujol (mineral oil), dirty motor oil (3M Co.) and chassis grease (#9, Sears). The AATCC soil-release method is described below. Both in parentheses and underlined are the changes that we made.

AATCC TEST METHOD 130–1969

Soil release: Oily stain release method

[Developed by AATCC Committee RA 56. Adopted 1969]

1. Purpose and scope 1.1 This test is designed to measure the ability of a fabric to release oily stains during home laundering.

2. Principle 2.1 A stain on a test specimen is produced by using a weight to force a given amount of the staining substance into the fabric. The stained fabric is then laundered in a prescribed manner and the residual stain rated on a scale of 5 to 1 by comparison with standard stain release replica showing a graduates series of stains.

3. Apparatus and materials 3.1 AATCC White Textile Blotting Paper (Kraft paper) (see 10.1).
3.2 Mineral oil, refined ("Nujol" Brand) (see 10.2).
3.3 Glassine paper (polyethylene) or equivalent (see 10.3).
3.4 Timer.
3.5 Weight, cylindrical 2.5" dia. (6.4 cm.), 5.0±0.1 lb. (see 10.4).
3.6 Medicine dropper, straight.
3.7 Washer, automatic (see 10.5).
3.8 Dryer, automatic (see 10.6).
3.9 AATCC Standard Detergent 124 (with optical brightener) (see 10.4).
3.10 Ballast—36 x 36" (92 x 92 cm.) hemmed pieces of type 128 cotton sheeting (see 10.7).
3.11 Lighting and evaluation area (see 10.8).
3.12 Table with "no glare" black top 24 x 36" (61 x 92 cm.); 35±1" (92±3 cm.) high.
3.13 Stain Release Replica (see 10.9).

4. Test specimens 4.1 Use three test specimens, 15 x 15" (*8" x 10"*) for each determination. Condition the test specimens for a minimum of four hours at 70±2F (21±1C) and 65±2% RH prior to application of stains.

5. Staining procedure 5.1 Place the test specimen flat on a single thickness of AATCC Textile Blotting Paper on a smooth, horizontal surface.
5.2 Using a medicine dropper, place 5 drops (*1 drop*) (ca. 0.2 ml.) "Nujol" Brand mineral oil (see 10.10) in the approximate center of the test specimen. (*When chassis grease was applied its amount was chosen to equal the amount of oily stains added.*)
5.3 Place a 3 x 3" (7.6 x 7.6 cm.) square of glassine paper (*polyethylene*) over the oil puddle.
5.4 Place the five-pound weight directly over the glassine (*polyethylene*) paper covering the oil puddle.
5.5 Allow weight to sit undisturbed for 60 seconds.
5.6 Remove weight and discard the glassine sheet.
5.7 Do not allow stained test specimens to contact each other in a manner which would transfer stains. Wash within 15 to 60 minutes after staining.

6. Washing procedure 6.1 Fill washer to high water level with water at one of the temperatures from Table A. Check with thermometer.

TABLE A

| Washing procedure: | Temperature |
|---|---|
| I | 105±5F (41±3C) |
| II | 120±5F (49±3C) |
| III | 140±5F (60±3C) |

(*Washing procedure II was used.*)

6.2 Add 140±5 grams (4.9±0.2 oz.) AATCC Standard Detergent 124, or known equivalent, to washer.
6.3 Place test specimens and ballast in washer, making a total load to equal 4.0±.25 lb. (see 10.11).
6.4 Set the dial on the washer for a "Normal" wash to run for 12 minutes (measured time) and allow cycle to run to completion. (This gives normal agitation in both the wash and rinse).
6.5 At the end of the final spin cycle, place the entire load, test specimens and ballast, into the dryer.
6.6 Dry at the "High" setting, 160±10F (70±6C), maximum stack temperature, for 45±5 minutes.
6.7 Remove test specimens from dryer. Rate residual stains within four hours after drying.

7. Evaluation 7.1 Mount the Stain Release Replica on the plywood mounting board, with the center of the standard 45" (107 cm.) from the floor.
7.2 Place the test specimen flat in the center of the "no glare" black topped table, with one edge of table touching the mounting board.
7.2 Viewing distance shall be 30" (76 cm.) from the back mounting board, with the eye at 62±6" (157±15 cm.) from the floor.
7.4 Compare the residual stain on the test specimen with the stains in the Stain Release Replica.

8. Rating procedure 8.1 Each of three individuals shall rate each test specimen for residual stain to nearest 0.5 rating according to Table B. (*One individual rated each specimen to the nearest 0.25 rating.*)

TABLE B

Stain release ratings

Class 5—Stain equivalent to Standard Stain 5.
Class 4—Stain equivalent to Standard Stain 4.
Class 3—Stain equivalent to Standard Stain 3.
Class 2—Stain equivalent to Standard Stain 2.
Class 1—Stain equivalent to Standard Stain 1.

Class 5 represents the best stain removal and Class 1 the poorest stain removal.

9. Report 9.1 Calculate the average of nine ratings for each fabric (three judgments on each of three specimens) to nearest 0.1. (*Only one rating made per stain.*)
9.2 Indicate washing procedure used by appropriate Roman numeral from Table I.
9.3 If stains other than the standard mineral oil are used, identify each stain and report the Stain Release Rating obtained for each stain separately. (*Since only one* rating was made per stain no average was calculated. In addition to reporting each rating, the total of the ratings for all the stains was calculated. When four stains are used a perfect total soil-release rating is 20.)

10. Notes 10.1 AATCC White Textile Blotting paper. Source: Standard Paper Mfg. Co., P.O. Box 1554, Richmond, Virginia 23212.

10.2 "Nujol" is the trademark of Plough, Inc. for a refined mineral oil. It is available in most drug stores. Saybolt viscosity 360/390 at 100F (38C); specific gravity 380/900 at 60F (15C).

10.3 Rhinelander "Blu-White" window envelope glassine-24 x 36 25#/500. Packages of glassine paper containing a roll 150' long by 12" wide are available from AATCC, P.O. Box 12215, Research Triangle Park, N.C. 27709.

10.4 Source: AATCC, P.O. Box 12215, Research Triangle Park, N.C. 27709.

10.5 Kenmore Automatic Washer Model 600 has been accepted as the standard machine. Source: Sears, Roebuck and Co.—for address of nearest Commercial Sales Department, write to AATCC, P.O. Box 12215, Research Triangle Park, N.C. 27709. Any other washer which is known to give comparable results may be used.

10.6 Kenmore Automatic Dryer Model 600 has been accepted as the standard. The temperature controls are designed so that either the gas or electric models should give equivalent results. Source: Sears, Roebuck and Co.— for address of nearest Commercial Sales Department, write to AATCC, P.O. Box 12215, Research Triangle Park, N.C. 27709. Any other dryer which is known to give comparable results may be used.

10.7 Source: Testfabrics, Inc., 55 Van Dam St., New York, N.Y. 10013.

10.8 Lighting and viewing area as described in AATCC Test Method 124 (Appearance of Durable Press Fabrics after Repeated Home Launderings); lighting equipment for viewing test specimens with overhead lighting. Place the black topped table with the 36" (92 cm.) edge against the mounting board.

10.9 The Stain Release Replicas developed by the Deering Miliken Research Corporation are available from AATCC, P.O. Box 12215, Research Triangle Park, N.C. 27709.

10.10 Although this test method presently calls for the use of only one standard stain, "Nujol" Brand mineral oil, other non-standard staining substances of interest to the user, in addition to the standard oil, may be applied to the test specimens, using this same technique. In such case the non-standard stain should be identified in the report.

10.11 The maximum number of test specimens shall be 30, with one stain per specimen, or a proportionately smaller number of test specimens if multiple stains are used on each specimen, e.g., 15 specimens with 2 stains each, etc. In any case, the maximum number of stains shall not exceed 30. (*Ten test specimens were washed at a time.*)

EXAMPLE 21

The reaction mixture of Example 8 was diluted with methylchloroform to prepare a pad bath that would give on padding 0.1% F OWF at 100% wet pickup. A light-brown 65/35 Dacron/cotton fabric (4 oz./yd.$^2$, Test fabrics), which previously had been treated with Aerotex LC (6% OWF, a durable-press resin based on 4,5-dihydroxydimethylolethyleneurea, American Cyanamid) and dried but not cured, was treated with this pad bath. A similar pad bath was prepared to give 0.2% F OWF on padding. An identical cloth sample was treated with this pad bath. Both fabrics were dried at 180–210° F. for 4.2 minutes and cured at 160° C. for 2.75 minutes.

After conditioning the samples were evaluated for oil repellency and soil release. In addition to these two fabrics a third fabric treated with the same level of Aerotex LC, but no soil-release agent, was evaluated. The results are given in Table II. The minimum total rating is four. The results show good soil-release and good durability.

EXAMPLE 22

The procedure of Example 21 was repeated with some of the other polyurethanes prepared. The results are given in Tables III and IV.

TABLE II

| Polyurethane | Percent F, OWF[a] | Oil repellency | Soil-release rating [b] | | | | | | | | | | | | | |
|---|---|---|---|---|---|---|---|---|---|---|---|---|---|---|---|---|
| | | | SW1[c] | | | | | W1SW1[d] | | | | | W5SW1[e] | | | | |
| | | | Total | I | II | III | IV | Total | I | II | III | IV | Total | I | II | III | IV |
| Example 8 | 0.1 | 2 | 12.50 | 3.75 | 3.75 | 3.00 | 2.00 | 12.00 | 3.50 | 3.50 | 2.00 | 2.00 | 12.00 | 3.50 | 3.50 | 3.00 | 2.00 |
| Do | 0.2 | 2 | 13.00 | 3.75 | 3.75 | 3.00 | 2.50 | 12.00 | 3.50 | 3.50 | 3.00 | 2.00 | 12.00 | 3.50 | 3.50 | 3.00 | 2.00 |
| None | None | 0 | 8.00 | 3.00 | 3.00 | 1.00 | 1.00 | 8.00 | 3.00 | 3.00 | 1.00 | 1.00 | 8.00 | 3.00 | 3.00 | 1.00 | 1.00 |

[a] OWF = On weight of fabric.
[b] I = Wesson oil; II = Nujol; III = dirty motor oil; IV = chassis grease.
[c] SW1 = Stained, washed once.
[d] W1SW1 = Washed once, stained, washed once.
[e] W5SW1 = Washed five times, stained, washed once.

TABLE III

| Polyurethane | Percent F, OWF[a] | Oil repellency | Soil-release rating [b] | | | | | | | | | |
|---|---|---|---|---|---|---|---|---|---|---|---|---|
| | | | SW1[c] | | | | | W1SW1[d] | | | | |
| | | | Total | I | II | III | IV | Total | I | II | III | IV |
| Example: | | | | | | | | | | | | |
| 10 | 0.2 | 4 | 11.50 | 4.00 | [e]3.75 | 1.75 | 2.00 | 10.50 | 3.50 | 3.50 | 1.75 | 1.75 |
| 11 | 0.1 | 3 | 11.50 | 4.00 | [e]3.50 | 1.50 | 2.50 | 10.25 | 3.25 | 3.50 | 1.50 | 2.00 |
| 12 | 0.1 | 4 | 10.75 | 3.75 | [e]3.75 | 1.50 | 1.75 | 9.50 | 3.50 | 3.50 | 1.00 | 1.50 |
| 13 | 0.2 | 4 | 10.00 | 4.00 | [e]3.50 | 1.00 | 1.50 | 9.75 | 3.50 | 3.75 | 1.00 | 1.50 |
| 14 | 0.2 | 3 | 11.00 | 3.50 | 3.00 | 2.00 | 2.50 | 9.75 | 3.50 | 3.25 | 1.00 | 1.00 |
| 15 | 0.1 | 3 | 11.25 | 3.50 | 3.50 | 2.00 | 2.25 | 9.00 | 3.25 | 3.25 | 1.00 | 1.50 |

[a] OWF = On weight of fabric.
[b] I = Wesson oil, II = Nujol, II = dirty motor oil, IV = chassis grease.
[c] SW1 = Stained, washed once.
[d] W1SW1 = Washed once, stained, washed once.
[e] Stain was SAE 140 motor oil instead of Nujol.

3,759,874

TABLE IV

| Polyurethane | Percent F, OWF [a] | Oil repellency | Soil-release rating [b] | | | | | | | | | | | | | |
|---|---|---|---|---|---|---|---|---|---|---|---|---|---|---|---|---|
| | | | SW1 [c] | | | | | W1SW1 [d] | | | | | W5SW1 [e] | | | |
| | | | Total | I | II | III | IV | Total | I | II | III | IV | Total | I | II | III | IV |
| Example: | | | | | | | | | | | | | | | | | |
| 17 | 0.1 | 2 | 11.75 | 3.50 | 3.50 | 2.75 | 2.00 | 11.50 | 3.50 | 3.50 | 2.50 | 2.00 | 11.00 | 3.50 | 3.50 | 2.50 | 1.50 |
| 18 | 0.2 | 2 | 10.75 | 3.75 | 3.50 | 1.50 | 2.00 | 10.75 | 3.75 | 3.50 | 1.50 | 2.00 | 10.50 | 3.50 | 3.50 | 1.50 | 2.00 |
| 19 | 0.2 | 2 | 14.00 | 3.75 | 3.75 | 3.50 | 3.00 | 13.00 | 3.75 | 3.75 | 3.00 | 2.50 | 12.00 | 3.50 | 3.50 | 3.00 | 2.00 |
| 20 | 0.1 | 2 | 14.00 | 3.75 | 3.75 | 3.50 | 3.00 | 12.50 | 3.50 | 3.50 | 3.00 | 2.50 | 12.00 | 3.50 | 3.50 | 3.00 | 2.00 |

[a] OWF = On weight of fabric.
[b] I = Wesson oil; II = Nujol; III = dirty motor oil; IV = chassis grease.
[c] SW1 = Stained, washed once.
[e] W5SW1 = Washed five times, washed once.

What is claimed is:

1. A fluorinated polyurethane having a chemical structure made up of the units $$-O-Z-OCONH-I-NHCO-$$
$$\phantom{-O-}|\phantom{Z-OCONH-I-NHCO-}$$
$$\phantom{-O-}R_f'$$

and $$-O(CH_2CH_2O)_m\left(CONH-I-NHCO-\right)_{0\,to\,1}$$

in the ratio of from at least 2 to about 24 fluorinated units to one nonfluorinated unit containing repeating oxyethylene groups, where $$-O-Z-O-$$
$$\phantom{-O-}|$$
$$\phantom{-O-}R_f'$$

is a residue of a fluorinated diol of the formula $$R_f C_m H_{2n-a}(OH)_a XR'(OH)_b$$

in which $R_f$ is a perfluoroalkyl group of 4–6 carbon atoms, X=O or S, R' is an aliphatic saturated hydrocarbon radical of 2–15 carbon atoms which may contain one or more ether linkages and $n=1–11$, $a=1$ or 0, $b=1$ or 2, $a+b=2$, and I is a divalent organic group from a diisocyanate, $I(NCO)_2$, m is an integer from about 8 to over 100.

2. A fluorinated polyurethane according to claim 1 wherein the fluorinated diol is $$C_8F_{17}CH_2CH_2CH_2OCH_2CHOHCH_2OH$$

3. A fluorinated polyurethane according to claim 1 wherein the fluorinated diol is $$C_8F_{17}CH_2CH_2SCH_2CHOHCH_2OH$$

4. A fluorinated polyurethane according to claim 1 wherein the fluorinated diol is $$C_8F_{17}(CH_2)_2SC_3H_6OCH_2CHOHCN_2OH$$

5. A fluorinated polyurethane according to claim 1 wherein the diisocyanate is tolylene diisocyanate.

6. A fluorinated polyurethane according to claim 1 wherein the diiosocyanate is isophorone diisocyanate.

References Cited
UNITED STATES PATENTS
3,591,547   7/1971   Boudakian et al. __ 260—77.5 AP DONALD E. CZAJA, Primary Examiner
M. J. WELSH, Assistant Examiner U.S. Cl. X.R.
260—77.5 TB, 77.5 AM, 77.5 AB, 77.5 AC

UNITED STATES PATENT OFFICE
CERTIFICATE OF CORRECTION

Patent No. 3,759,874         Dated Sept. 18, 1973

Inventor(s) John T. Gresham

It is certified that error appears in the above-identified patent and that said Letters Patent are hereby corrected as shown below:

Column 1, line 15, "N" should be omitted at end of $1^{st}$ formula.

Column 4, line 5, "isocyanates" should read --diisocyanates--.

Column 6, line 14, "ont" should read --one--.

In $4^{th}$ sample of Table, Columns 9 and 10, ampersand is omitted, should read --$R_f(CH_2)_2$&$_4SCH_2CH(OH)CH_2OH$ (Example 6)--.

In $5^{th}$ sample of Table, Columns 9 and 10, "$OCH_2(OH)$" should read --$OCH_2CH(OH)$--.

Column 11, line 39, "hours at 7.974" should read --hours a 7.974--.

Column 12, line 36, "Analysis indicated the conversion was 98%" should read --Analysis indicated the conversion was only 80%. Heating was continued for 24 hours, analysis showed the conversion was 98%.--

Column 12, line 46, "0.638g" should read --0.368g--.

Column 12, line 52, "$C_8F_{17}(CH_2)_2SCH_2CHOHCH_2$" should read --$C_8F_{17}(CH_2)_2SCH_2CHOHCH_2OH$--.

UNITED STATES PATENT OFFICE
CERTIFICATE OF CORRECTION

Patent No. 3,759,874                        Dated Sept. 18, 1973

Inventor(s) John T. Gresham                              Page 2

It is certified that error appears in the above-identified patent and that said Letters Patent are hereby corrected as shown below:

Columns 11 and 12, Table I title, "$C_8F_{57}(CH)_2SCH_2CHOHCH_2OH$" should read --$C_8F_{17}(CH_2)_2SCH_2CHOHCH_2OH$--.

Columns 11 and 12, Table 1, second title, "Carbowax-PD Adduct(moles)$^a$" should read --Carbowax-IPDI Adduct(moles)$^a$--

Columns 15 and 16, Table III, footnote b "II=dirty motor oil," should read --III=dirty motor oil,--.

Columns 17 and 18, Table IV, footnote d was omitted entirely should read --$d_{W1SW1}$ = Washed once, stained, washed once.

Claim 4, "$C_8F_{17}(CH_2)_2SC_3H_6OCH_2CHOHCN_2OH$" should read --$C_8F_{17}(CH_2)_2SC_3H_6OCH_2CHOHCH_2OH$--.

Signed and sealed this 6th day of May 1975.

(SEAL)
Attest:

RUTH C. MASON
Attesting Officer

C. MARSHALL DANN
Commissioner of Patents
and Trademarks